(12) United States Patent
Oomi

(10) Patent No.: US 9,760,163 B2
(45) Date of Patent: Sep. 12, 2017

(54) SENSOR SIGNAL PROCESSOR

(71) Applicant: DENSO CORPORATION, Kariya, Aichi-pref. (JP)

(72) Inventor: Keita Oomi, Anjo (JP)

(73) Assignee: DENSO CORPORATION, Kariya (JP)

( * ) Notice: Subject to any disclaimer, the term of this patent is extended or adjusted under 35 U.S.C. 154(b) by 478 days.

(21) Appl. No.: 13/798,267

(22) Filed: Mar. 13, 2013

(65) Prior Publication Data

US 2013/0246007 A1    Sep. 19, 2013

(30) Foreign Application Priority Data

Mar. 14, 2012    (JP) .................................. 2012-57231

(51) Int. Cl.
| | | |
|---|---|---|
| *G01D 5/244* | (2006.01) | |
| *G06F 3/00* | (2006.01) | |
| *F02D 41/00* | (2006.01) | |
| *F02D 35/02* | (2006.01) | |

(52) U.S. Cl.
CPC ............ *G06F 3/007* (2013.01); *F02D 35/027* (2013.01); *F02D 41/009* (2013.01)

(58) Field of Classification Search
CPC ......... F02D 2041/281; F02D 2041/288; F02D 2250/14; F02D 35/023; F02D 35/027; F02D 41/2441; F02D 41/2451; F02D 41/263; F02P 5/1521; G01L 23/225
See application file for complete search history.

(56) References Cited

U.S. PATENT DOCUMENTS

| | | | |
|---|---|---|---|
| 4,408,483 A * | 10/1983 | Bollinger .............. | G01M 15/08 |
| | | | 73/114.16 |
| 2002/0179053 A1 | 12/2002 | Kokubo et al. | |
| 2005/0096865 A1* | 5/2005 | Sugiura et al. ............... | 702/151 |
| 2005/0166665 A1* | 8/2005 | Honda .......................... | 73/35.12 |
| 2005/0268886 A1* | 12/2005 | Etou et al. .............. | 123/406.29 |
| 2009/0005956 A1* | 1/2009 | Yoshihara ............. | F02D 35/027 |
| | | | 701/111 |
| 2009/0078234 A1* | 3/2009 | Barrett .................. | F02P 5/1522 |
| | | | 123/406.37 |
| 2010/0180849 A1* | 7/2010 | Senda et al. ............... | 123/179.4 |

(Continued)

FOREIGN PATENT DOCUMENTS

| | | |
|---|---|---|
| JP | S62-150056 A | 7/1987 |
| JP | H02-19873 U | 2/1990 |
| JP | 2001-152951 A | 6/2001 |

(Continued)

*Primary Examiner* — Janet Suglo
*Assistant Examiner* — Lisa Peters
(74) *Attorney, Agent, or Firm* — Posz Law Group, PLC

(57) ABSTRACT

A microcomputer which constitutes an ECU transmits a start/stop signal and a crank angle signal to an analog input circuit. The analog input circuit is activated when the start/stop signal is received. The A/D converter converts a sensor signal into a digital signal. The digital processor detects a peak value of the digital signal. A counter restarts a counting operation when the crank angle signal is received. A data register sends a detected data of the peak value as a specified information adding by a count value and an information of the crank angle signal to the microcomputer. The microcomputer acquires the crank angle of the specified information by computing the crank angle from the detected data.

17 Claims, 3 Drawing Sheets

(56) References Cited

U.S. PATENT DOCUMENTS

2013/0179052 A1\* 7/2013 Kawakami ............ F02D 35/027
  701/111

FOREIGN PATENT DOCUMENTS

| JP | 2002-89346 A | 3/2002 |
|----|--------------|--------|
| JP | 2003-21032 A | 1/2003 |
| JP | 2005-315169 A | 11/2005 |
| JP | 2008-232034 A | 10/2008 |
| JP | 2011-058434 A | 3/2011 |

\* cited by examiner

SENSOR SIGNAL PROCESSOR

CROSS-REFERENCE TO RELATED APPLICATION

This application is based on Japanese Patent Application No. 2012-57231 filed on Mar. 14, 2012, the disclosure of which is incorporated herein by reference.

TECHNICAL FIELD

The present disclosure relates to a sensor signal processor.

BACKGROUND

JP-2001-152951A describes a sensor signal processor to control an engine having an analog input circuit. In the analog input circuit, a sensor signal of a sensor detecting an operation state of the engine is inputted and converted into a digital signal, and then the digital signal and the sensor signal are digital-processed so as to output to a microcomputer. Specifically, the sensor signal is converted into the digital signal by an A/D converter at a predetermined period. The digital signal is extracted for a specified value by a digital processor. The digital signal is sent to the microcomputer by adding a crank angle information.

In this case, in a configuration for inputting an information (crank information) of the crank angle into the analog input circuit, signal wires are connected with the analog input circuit from the microcomputer. The signal wires are provided so that the crank information acquired by a hardware of the microcomputer and the crank information acquired by a software of the microcomputer are independently inputted into the analog input circuit. Further, the crank information includes a signal NE which corresponds to an angle of one tooth of a crank, a signal G2 which shows whether the crank angle is in a first half or a second half of 720 deg. CA in a four-cycle engine, and a signal of a top dead center of a cylinder. Therefore, it is necessary that six signal wires are connected with the analog input circuit from the microcomputer.

Conventionally, as described above, it is necessary to provide a plurality of signal wires between the microcomputer and the analog input circuit, which makes a size of the analog input circuit larger and leads to an increase in cost. In a case where the crank information acquired by the software is only inputted into the analog input circuit to reduce the increase in cost, a processing load of the microcomputer may be increased. In a case where the crank information acquired by the hardware is only inputted into the analog input circuit to reduce the increase in cost, an incorrect crank information may be obtained when a rotational speed of an engine is changed at a low speed operation.

SUMMARY

It is an object of the present disclosure to provide a sensor signal processor, in which a crank angle information of a specified information acquired from a sensor signal in an analog input circuit can be acquired in a microcomputer, and a number of signal wires between the analog input circuit and the microcomputer can be reduced.

According to an aspect of the present disclosure, an angle signal is inputted from a crank angle sensor to a crank angle signal circuit in the microcomputer, and a crank angle signal is outputted to the analog input circuit via the microcomputer. In the analog input circuit, a sensor signal of a sensor detecting an operation state of an engine is inputted and converted to a digital signal by the A/D converter. Further, a specified information is acquired from the digital signal by the digital processor. The specified information adding by a count value of a counter is stored as a detected data in a data register. The data register sends the detected data according to a sending request from a controller of the microcomputer. In the microcomputer, the crank angle of the specified information can be computed by the controller based on the count value and the crank angle signal in the specified information of the detected data. Thus, the microcomputer can acquire the crank angle of the specified information from the sensor signal in the analog input circuit without using a plurality of signal wires.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
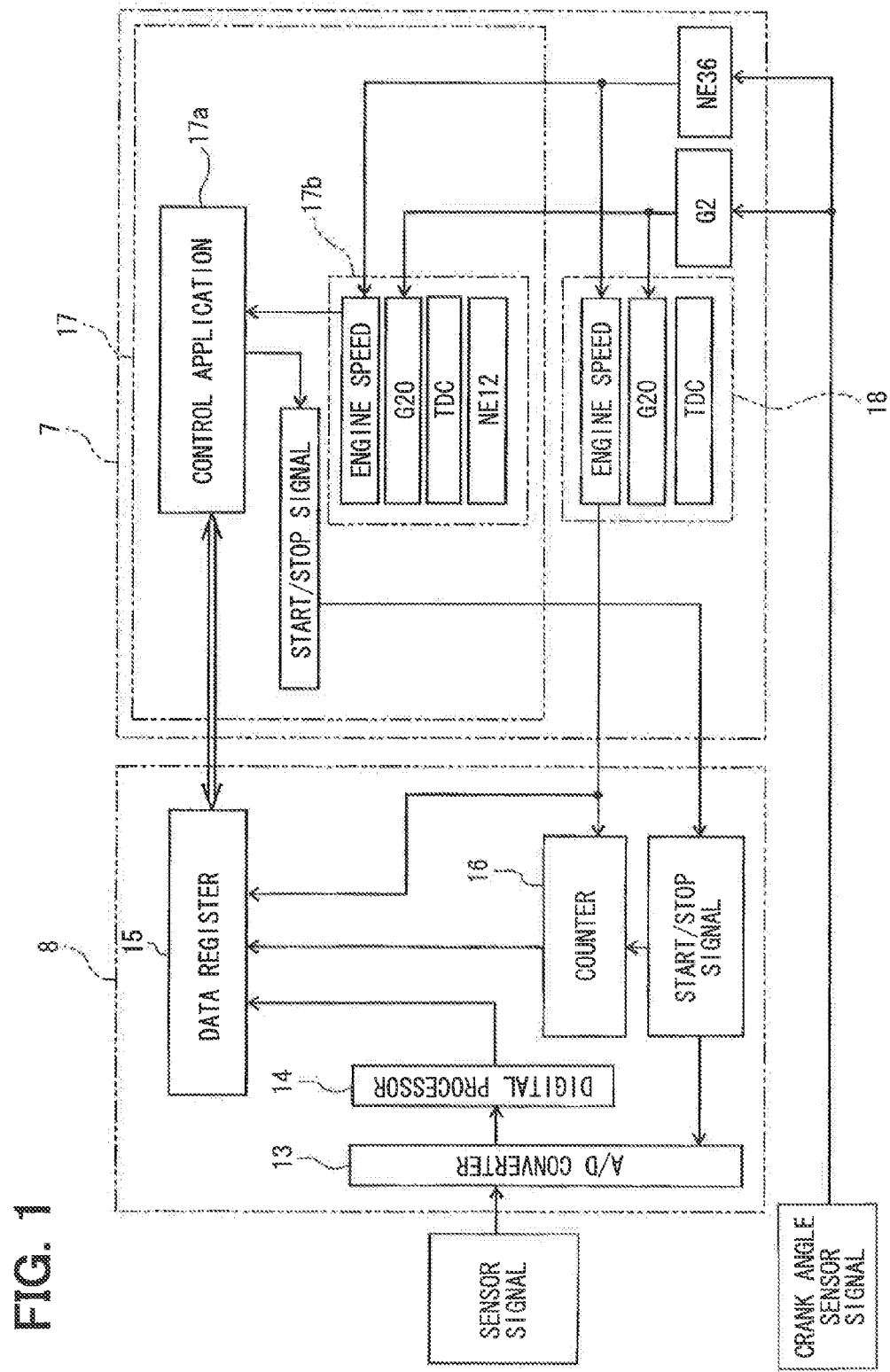
FIG. 1 is a block diagram showing a microcomputer and an analog input circuit according to an embodiment of the present disclosure.

Hereafter, embodiments of the present disclosure will be described. The same parts and components as those in each embodiment are indicated with the same reference numerals and the same descriptions will not be reiterated.

Figure 2:
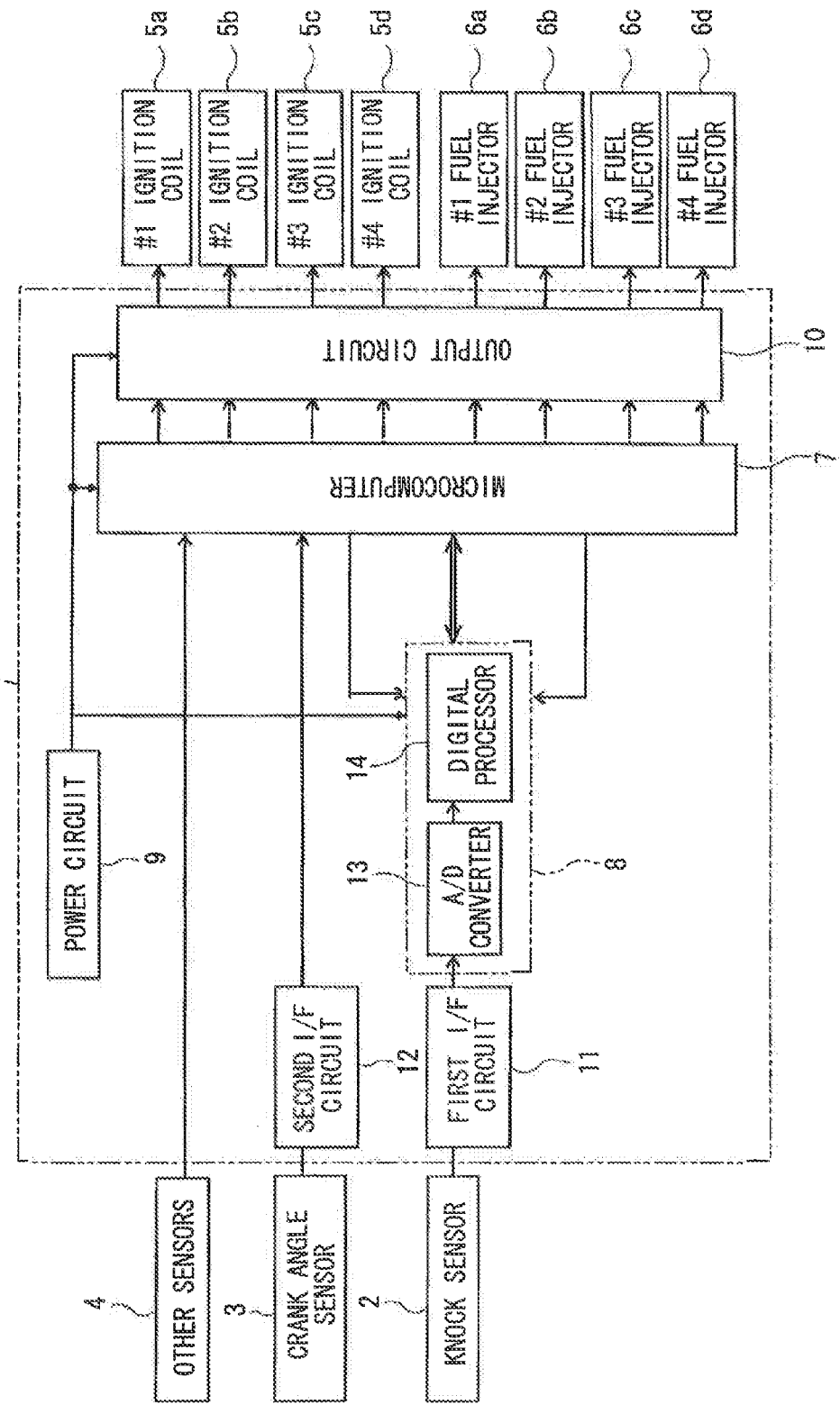
FIG. 2 is a block diagram showing a sensor signal processor according to the embodiment.
Figure 3:
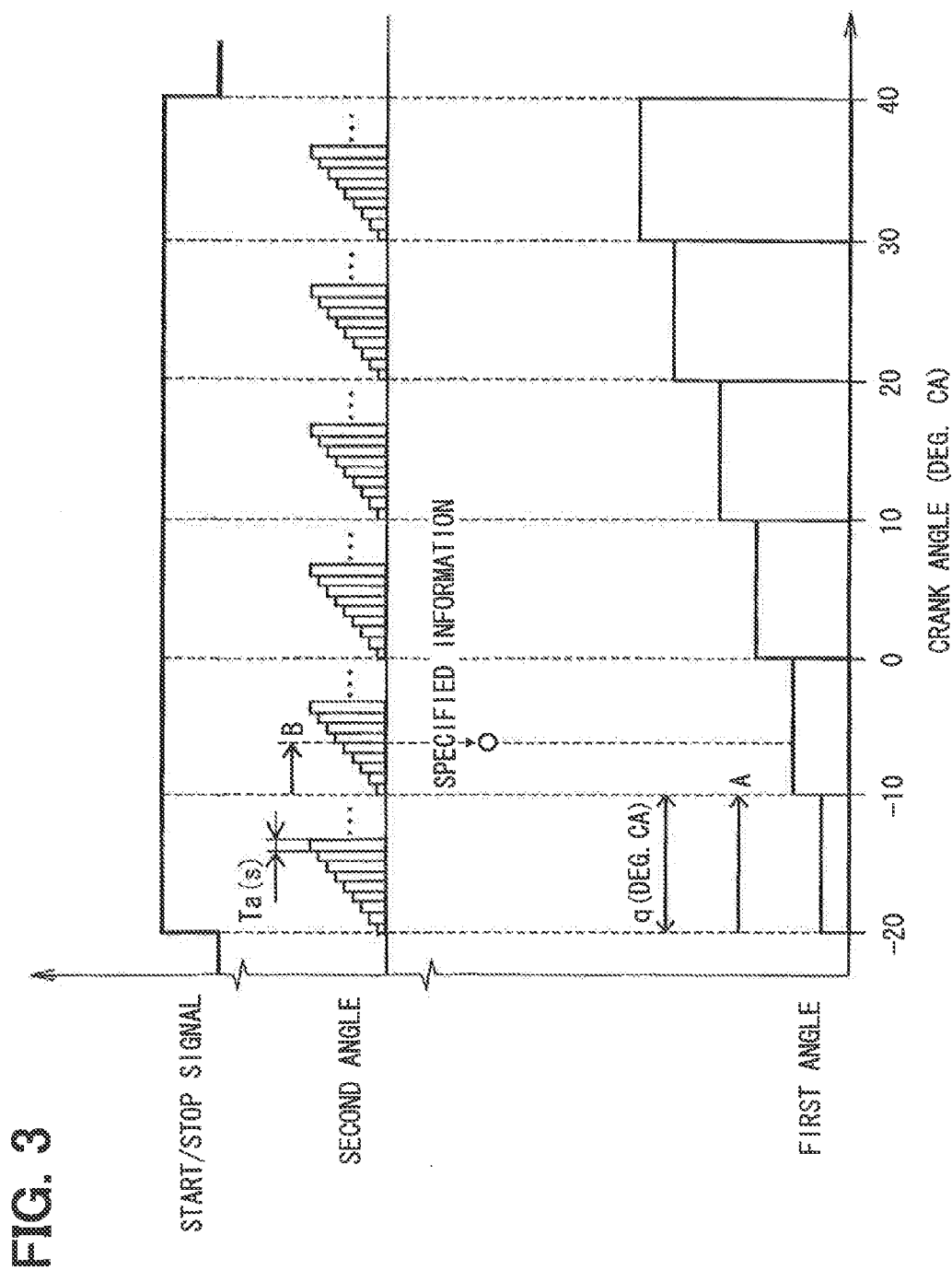
FIG. 3 is a graph showing a computation method of a crank angle according to the embodiment.

Referring to FIGS. 1 to 3, an embodiment of the present disclosure will be described.

In FIG. 2, an electronic control unit (ECU) 1 represents a sensor signal processor. The ECU 1 is connected with a knock sensor 2, a crank angle sensor 3, and other sensors 4. The knock sensor 2 is a sensor for detecting an operation state of an engine. The crank angle sensor 3 is a sensor for detecting a crank angle. A plurality of sensor signals from the above sensors is transmitted into the ECU 1.

Further, for example, in a four-cylinder engine, the ECU 1 is connected with four ignition coils 5a to 5d and four fuel injectors 6a to 6d.

The ECU 1 includes a microcomputer 7, an analog input circuit 8, a power circuit 9, and an output circuit 10. The analog input circuit 8 receives and digital-processes a sensor signal of the knock sensor 2. The analog input circuit 8 includes an A/D converter 13 and a digital processor 14. The power circuit 9 is energized by a battery of a vehicle to generate a predetermined voltage. The energized voltage is supplied to each part of the ECU 1.

The knock sensor 2 is connected with the A/D converter 13 via a first I/F circuit 11. The first I/F circuit 11 performs a noise removal or an anti-aliasing filtering, relative to the sensor signal inputted from the knock sensor 2. The crank angle sensor 3 is connected with the microcomputer 7 via a second I/F circuit 12. The second I/F circuit 12 waveform-shapes a crank angle sensor signal of the crank angle sensor 3 and transmits the crank angle sensor signal to the microcomputer 7.

Referring to FIG. 1, the analog input circuit 8 further includes a data register 15 and a counter 16. When a start trigger of a start/stop signal is transmitted from the microcomputer 7 to the A/D converter 13, the sensor signal inputted from the knock sensor 2 via the first I/F circuit 11 is converted into a digital signal at a predetermined period and the digital signal is transmitted to the digital processor 14.

The digital processor 14 outputs a specified information to the data register 15 based on the digital signal inputted from the A/D converter 13. The specified information may be a peak value of the digital signal after being digital-processed. Since the sensor signal is detected by the knock sensor 2, the specified information can be acquired as other form instead of the peak value by being digital-processed.

The counter 16 is a timer which increases a count value at a predetermined counting period. The start/stop signal and a crank angle signal are transmitted from the microcomputer 7 to the counter 16. The counter 16 is activated when the start trigger of the start/stop signal is received. Further, the count value is reset when the crank angle signal is received from the microcomputer 7, and the counter 16 restarts a counting operation.

The data register 15 stores the specified information obtained by adding the count value of the counter 16 and a crank angle information showing a start time of the count value, when the specified information is inputted from the digital processor 14. The data register 15 sends or receives a data relative to the count value by communicating with the microcomputer 7. When the data register 15 receives a stop trigger of the start/stop signal from the microcomputer 7 as receiving a data sending request, the data register 15 sends the specified information and the data to the microcomputer 7.

The microcomputer 7 includes a controller 17 which have a CPU, a memory and an interface circuit, and a crank angle signal circuit 18 which generates a crank angle signal. The controller 17 has a control application portion 17a and a crank angle detecting portion 17b, as internal functions. The crank angle sensor signal of the crank angle sensor 3 is transmitted to the crank angle signal circuit 18 and the controller 17. The crank angle signal circuit 18 may be a hardware circuit of the microcomputer 7.

The controller 17 computes a crank angle of the specified information based on the crank angle information transmitted from the analog input circuit 8. Further, the controller 17 generates an engine speed signal, a G2O signal, a TDC signal and a NE12 signal, at the crank angle detecting portion 17b based on the crank angle sensor signal of the crank angle sensor 3. The G2O signal is a flag showing whether the crank angle is at a first 360 deg. CA period or a second 360 deg. CA period. The TDC signal shows a top dead center of the crank angle. The NE12 signal is generated each 30 deg. CA period. Furthermore, the controller 17 generates the start/stop signal so that the peak value of the knock sensor 2 can be detected in a predetermined range and outputted to the analog input circuit 8. In this case, the predetermined range has a TDC of the crank angle, for example, from BTDC (before TDC, e.g. −20 deg. CA) to ATDC (after TDC, e.g. 40 deg. CA).

The crank angle signal circuit 18 detects the engine speed signal, the G2O signal and the TDC signal based on the crank angle sensor signal of the crank angle sensor 3, and performs a computation if necessary so as to transmit the crank angle signal to the data register 15 and the counter 16 at a predetermined crank angle such as 10 deg. CA.

Referring to FIG. 3, operations of the present disclosure will be described.

The crank angle sensor signal of the crank angle sensor 3 according to a rotation of the engine is transmitted to the ECU 1. The microcomputer 7 starts a control application to generate the crank angle signal from the crank angle sensor signal of the crank angle sensor 3, and transmits the crank angle signal to the analog input circuit 8 at the predetermined crank angle. In the crank angle detecting portion 17b, the engine speed signal, the G2O signal, the TDC signal and the NE12 signal are generated based on the crank angle sensor signal of the crank angle sensor 3, and are transmitted to the control application portion 17a.

As shown in FIG. 3, the start/stop signal is transmitted to the analog input circuit 8 when the crank angle signal is in the predetermined range. Specifically, the start/stop signal is controlled so that the start trigger is activated at a time where the crank angle is −20 deg. CA, and the stop trigger is activated at a time where the crank angle is +40 deg. CA.

When the start trigger is transmitted to the analog input circuit 8, the A/D converter 13 converts the sensor signal of the knock sensor 2 into the digital signal at the predetermined period and transmits the digital signal to the digital processor 14. The digital processor 14 detects the peak value of the digital signal, and transmits the peak value as the specified information to the data register 15.

When the start trigger is transmitted to the analog input circuit 8, the counter 16 is activated and starts the counting operation at the predetermined counting period. Referring to FIG. 3, the counter 16 continues the counting operation until the crank angle signal is received from the microcomputer 7 at the predetermined crank angle. Then, the counter 16 resets the count value and restarts the counting operation. When the specified information is received, the data register 15 stores the specified information obtained by adding the count value K and the crank angle signal A.

When the stop trigger is transmitted to the analog input circuit 8, the A/D converter 13, the digital processor 14 and the counter 16 are all terminated. Then, the data register 15 sends a detected data to the controller 17 of the microcomputer 7 because the stop trigger is received as the data sending request. The detected data includes the specified information obtained by adding the count value "K" and the crank angle signal "A" at a time where the stop trigger is received.

The controller 17 computes the crank angle of the specified information based on the detected data. Specifically, a first angle "A" indicates the crank angle when the start trigger is activated. For example, the crank angle signal "A" may indicate the crank angle every 10 deg. CA from a standard angle (e.g., −20 deg. CA). Therefore, the first angle "A" may be computed by multiplying a number "M" of the crank angle signal by an interval angle q (e.g. 10 deg. CA) of the crank angle. Further, a second angle "B" which is a crank angle corresponds to the count value "K" is computed, and the crank angle can be computed by adding the second angle "B" to the first angle "A". Since the start trigger is activated at a time where the crank angle is −20 deg. CA, the crank angle can be converted to a crank angle value by adding −20 deg. CA to the crank angle in a case where the TDC is 0 deg. CA.

For example, the engine speed is "N" rpm, that is, the engine speed is N/60 per second. The predetermined counting period is Ta (s), and a per-second crank angle "p" (deg. CA) can be computed by a formula (1).

$$p(\text{deg. CA}) = N/60 \times Ta \tag{1}$$

Since the count value is "K", the second angle "B" can be computed by a formula (2).

$$B(\text{deg. CA}) = N/60 \times K \times Ta \quad (2)$$

Then, the crank angle "C" can be computed by a formula (3).

$$C(\text{deg. CA}) = A + N/60 \times K \times Ta \quad (3)$$

Specifically, the start trigger is BTDC (−20 deg. CA), the stop trigger is ATDC (+40 deg. CA), the engine speed "N" is 2000 rpm, the number "M" of the crank angle signal is "1", and the interval angle q is 10 deg. CA.

$$A(\text{deg. CA}) = q \times M = 10 \times 1 = 10$$

Further, the count value "K" is "6", and the predetermined counting period Ta is "1" ms.

$$B(\text{deg. CA}) = N/60 \times K \times Ta = 2000/60 \times 6 \times 1 \times 0.001 = 0.2$$

When the crank angle uses a starting angle BTDC (−20 deg. CA) as the standard angle, it is established that "A"+"B"=10.2. Thus, the crank angle (deg. CA)=−20+10.2 when the TDC is 0 deg. CA. That is, the crank angle (deg. CA)=TDC−9.8.

According to the present disclosure, an angle computation accuracy can be improved by a combination of the count value and a 10 deg. CA step signal.

When the specified information and the crank angle information are acquired, the microcomputer 7 can control an ignition or a fuel injection in each cylinder by using the controller 17. Specifically, the microcomputer 7 controls the ignition coils 5a to 5d or the fuel injectors 6a to 6d at a time according to each cylinder to ignite or inject the fuel, based on the information acquired.

(1) According to the present embodiment, in the analog input circuit 8, the sensor signal of the knock sensor 2 is converted into the digital signal by the A/D converter 13 when the start trigger of the start/stop signal is received. Further, the specified information is acquired from the digital signal by the digital processor 14. The specified information obtained by adding the count value of the counter 16 and the crank angle information is stored as the detected data. When the stop trigger of the start/stop signal is activated, the detected data is transmitted to the microcomputer 7. In the microcomputer 7, the crank angle of the specified information can be computed. Therefore, the microcomputer 7 can acquire the crank angle of the specified information relative to the crank angle in the analog input circuit 8, without connecting a plurality of wires with the analog input circuit 8.

(2) According to the present embodiment, a detecting operation of the knock sensor 2 is performed by the controller 17 of the microcomputer 7, when the start/stop signal set in the predetermined range is transmitted to the analog input circuit 8. Since the A/D converter 13 and the counter 16 are activated at a time of the start trigger, the crank angle can be accurately detected by the detecting operation.

(3) According to the present embodiment, the count value of the counter 16 is reset when the crank angle advances for the predetermined crank angle each time, and the counter 16 restarts the counting operation. Because the microcomputer 7 computes the crank angle based on the count value, the computation is simple so that a processing load can be reduced.

Other Embodiment

The present disclosure is not limited to the embodiment mentioned above, and can be applied to various embodiments which are also within the spirit and scope of the present disclosure. For example, the embodiments may be as the followings.

The present disclosure is not limited to use the knock sensor 2, but another sensor signal of another sensor may be processed.

The predetermined range of the start/stop signal is not limited to a range from BTDC (−20 deg. CA) to ATDC (+40 deg. CA). The predetermined range may be set to a proper range. Alternatively, the predetermined range may be not set, that is, the predetermined range is set to a range so that all the crank angles can be detected.

The predetermined crank angle is not limited to 10 deg. CA, and can be set to another proper angle such as 5 deg. CA or 1 deg. CA.

The present disclosure is not limited that the counting operation is reset and restarted at the predetermined crank angle. The counting operation may be continued without a reset action. Specifically, the count value of when the crank angle signal is received is stored. The count value M may be computed by a difference between the stored count value and the count value of when the stop trigger is received.

The crank angle signal may be used after being multiplied according to an accuracy request.

In addition of the knock sensor, a sensor detecting the operation state of the engine may be used, for example, a vibration sensor or a pressure sensor.

What is claimed is:

1. A sensor signal processor, comprising:
   a microcomputer which includes a crank angle signal circuit configured to receive an angle signal from a crank angle sensor and outputting a crank angle signal, and a controller receiving the angle signal and generating a start/Stop signal at a predetermined interval to detect a peak value of a knock sensor; and
   an analog input circuit which receives the crank angle signal and the start/stop signal and generates a detected data by adding a crank angle information to a specified information acquired from a digital signal converted from a sensor signal detected by a sensor for detecting an operation state of an engine, wherein
   the analog input circuit includes:
   an A/D converter which converts the sensor signal into the digital signal at a predetermined period;
   a digital processor which acquires the specified information for controlling the engine based on the digital signal converted by the A/D converter;
   a counter which performs a counting operation at a predetermined counting period; and
   a data register which stores the specified information obtained by summing a count value of the counter when the specified information is received from the digital processor as the detected data, and which sends the detected data according to a sending request of the controller.

2. The sensor signal processor according to claim 1, wherein the controller of the microcomputer computes a crank angle of the specified information, based on the count value of the detected data received from the data register and the crank angle information of when the counter is activated.

3. The sensor signal processor according to claim 1, wherein the controller of the microcomputer performs a detecting operation of the sensor by transmitting the start/stop signal set in a predetermined range to the analog input circuit.

4. The sensor signal processor according to claim 1, wherein the counter resets the count value and restarts the counting operation, when the crank angle relative to the crank angle signal advances for a predetermined crank angle each time.

5. The sensor signal processor according to claim 1, wherein the controller of the microcomputer includes a CPU, memory, and an interface circuit.

6. The sensor signal processor according to claim 1 wherein the microcomputer is operatively connected to the analog input circuit, and the crank angle sensor is operatively connected to the microcomputer.

7. The sensor signal processor according to claim 6, wherein the sensor for detecting an operation state of the engine is operatively connected to the analog input circuit.

8. The sensor signal processor according to claim 1, wherein the sensor for detecting an operation state of the engine is operatively connected to the analog input circuit.

9. The sensor signal processor according to claim 1, wherein the controller generates the start/stop signal so that the peak value of the knock sensor can be detected in a predetermined range and outputted to the analog input circuit.

10. The sensor signal processor according to claim 1, wherein the A/D converter converts the sensor signal into the digital signal in response to receiving the start/stop signal.

11. The sensor signal processor according to claim 1, wherein the counter restarts the counting operation in response to receiving the start/stop signal and the crank angle signal.

12. The sensor signal processor according to claim 1, wherein the crank angle signal circuit is a hardware circuit.

13. The sensor signal processor according to claim 1, wherein the A/D converter and the counter of the analog input circuit receive the start/stop signal from the controller of the microcomputer.

14. The sensor signal processor according to claim 1, wherein the start/stop signal includes a start trigger and a stop trigger.

15. The sensor signal processor according to claim 14, wherein the A/D converter converts a sensor signal of the knock sensor into the digital signal and transmits the digital signal to the digital processor of the analog input circuit in response to receiving the start trigger from the controller of the microcomputer, and the digital processor detects the peak value of the digital signal and transmits the peak value to the data register in response to receiving the digital signal from A/D converter of the analog input circuit, and the counter starts a counting operation at a predetermined counting period in response to receiving the start trigger from the controller of the microcomputer, continues the counting operation until the angle signal is received from the microcomputer at a predetermined crank angle, resets the count value, and restarts the counting operation.

16. The sensor signal processor according to claim 14, wherein the A/D converter, the digital processor, and the counter of the analog input circuit stop in response to receiving the stop signal from the controller of the microcomputer, and the counter sends the detected data to the controller in response to receiving the stop signal, which is the sending request.

17. The sensor signal processor according to claim 1, wherein the A/D converter, the digital processor, and the counter of the analog input circuit stop in response to receiving the stop signal from the controller of the microcomputer, and the counter sends the detected data to the controller in response to receiving the stop signal, which is the sending request.

* * * * *